United States Patent
Kikuchi et al.

(10) Patent No.: US 6,463,480 B2
(45) Date of Patent: *Oct. 8, 2002

(54) METHOD AND SYSTEM OF PROCESSING A PLURALITY OF DATA PROCESSING REQUESTS, AND METHOD AND SYSTEM OF EXECUTING A PROGRAM

(75) Inventors: Michio Kikuchi, Sagamihara; Yuichi Nakamura; Seiji Hamada, both of Yokohama, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,426

(22) Filed: Mar. 10, 1997

(65) Prior Publication Data

US 2001/0056457 A1 Dec. 27, 2001

(30) Foreign Application Priority Data

Jul. 4, 1996 (JP) .............................. 8-175210

(51) Int. Cl.[7] .............................................. G06F 9/54
(52) U.S. Cl. ...................................................... 709/315
(58) Field of Search ................................ 709/100, 102, 709/107, 104, 315, 316

(56) References Cited

U.S. PATENT DOCUMENTS

| | | | | | |
|---|---|---|---|---|---|
| 5,345,588 A | * | 9/1994 | Greenwood et al. | ........ | 709/107 |
| 5,613,114 A | * | 3/1997 | Anderson et al. | ........... | 709/108 |
| 5,619,710 A | * | 4/1997 | Travis, Jr. et al. | .......... | 709/203 |
| 5,715,450 A | * | 2/1998 | Ambrose et al. | ........... | 707/103 |
| 5,729,710 A | * | 3/1998 | Magee et al. | ............... | 711/203 |
| 5,752,031 A | * | 5/1998 | Cutler et al. | ................ | 709/103 |
| 5,764,915 A | * | 6/1998 | Heimsoth et al. | ........... | 709/227 |
| 5,765,157 A | * | 6/1998 | Lindholm et al. | .......... | 707/101 |
| 5,805,886 A | * | 9/1998 | Skarbo et al. | .............. | 709/305 |

\* cited by examiner

*Primary Examiner*—Zarni Maung
*Assistant Examiner*—George L. Opie
(74) *Attorney, Agent, or Firm*—Scully, Scott Murphy & Presser; Manny Schecter, Esq.

(57) ABSTRACT

The present invention is directed to an environment in which a safe program having high thread isolation can easily be constructed, and the effective utilization of resources can be achieved when concurrently processing a plurality of client requests. More specifically, a client request 101 is transformed into a common format, and stored in a queue 125 in the form of packet information. A control unit 127 reads the packet information, and instructs a thread control unit 131 to create a thread. A thread object 141 referenced only from the created thread is created by copying a thread object template 149 prestored in the system. Client requests are divided into three types: creation of an object, utilization of an object method, and deletion of an object, and a thread is created only during the execution of a client request.

17 Claims, 14 Drawing Sheets

135

| Pointer to actual object 231 | Proxy ID 233 |
|---|---|
| 1 1 1 1 | A A A A |
|  |  |
|  |  |

| Pointer to actual object 201 | Object name 203 | Thread object? 205 |
|---|---|---|
| 3 2 1 E | ORDER | YES |
| 5 6 2 3 | CUSTOMER | YES |
| 3 9 2 5 | STOK | NO |
| 9 3 2 1 | FIFO | NO |
| 8 3 4 F | TCPIP | NO |
| ⋮ | ⋮ | ⋮ |

Figure 9

METHOD AND SYSTEM OF PROCESSING A PLURALITY OF DATA PROCESSING REQUESTS, AND METHOD AND SYSTEM OF EXECUTING A PROGRAM

BACKGROUND OF THE INVENTION

1. Technical Field

The present invention relates to a multitask control method for processing a plurality of requests in parallel, and particularly to a method for supporting the construction of a multithread program.

2. Prior Art

Conventionally, to process a plurality of requests in parallel, a plurality of threads is created in a memory area managed by the system and a program is executed on a thread basis. The thread is the smallest execution unit existing in a process and characterized by a stack and a program counter. In an ordinary program, only one such execution unit exists, but, in a multithread program, a plurality of such execution units exists at the same time. That is, the concurrent execution of a plurality of processes is enabled, and it is an essential technique for developing server programs and the like.

However, in the prior art, as the functions of a server, the programmer needs to explicitly specify a facility for concurrently accepting client requests, and low-level instructions (API) for carrying out a processing for creating/deleting a thread, a synchronous processing among threads, and the like. Thus, the programmer is required to have a very high skill.

For instance, in the process for manipulating thread-specific data and global data, it is necessary to perform a programming shown below. In this case, it is exemplified by C++ (API of OS/2: "OS/2" is a trademark of IBM Corporation), which is one of programming languages. In this process, the Increment ( ) method of an Order object is invoked to increment a, a thread-specific variable, and simultaneously the result is stored in stock, a global object.

```
Stock *stock; //Global object, which is accessed from
a plurality
// of threads.
HMTX hmtx; // Semaphore handle for access to a global
object
main ()
{
stock=new Stock; //Creation of a global object
DosCreateMutexSem("¥¥SEM32¥¥sem1", &hmtx, 0, FALSE);
//Global object/semaphore for access...
while(!empty) { //Message loop for processing
//the request from client
Getmessage(&msg); //Calling of a message from a queue
switch(msg-> task) {
case NEW:   //When the generation of an object is
requested from
// client,
_beginthread(TreadNew, NULL, NULL, msg);
//create a thread and execute a ThreadNew function.
break;
case INCREMENT: //An increment request from ciient
_beginthread(ThreadInc, NULL, NULL, msg);
//Create a thread and execute a ThreadInc function.
break;
case DELETE: //When the deletion of an object is
requested from
// client,
_beginthread(ThreadDelete, NULL, NULL, msg);
//create a thread and execute a ThreadDelete function.
break;
....
}
}
}
ThreadNew (MESSAGE *msg)
{
Order *obj = new Order();
GlobalTable[msg->clientID] = obj
//Create an object and registration it into a table to
associate
//the client ID with the created object.
}
ThreadInc(MESSAGE *msg)
{
Order *obj = GlobaleTable[msg->ClientID];
//Take out the object associated with client.
Obj->Increment();
//Invoke the Increment() method of the object.
}
ThreadDelete(MESSAGE *msg);
{
Order *obj = GlobaleTable[msg->ClientID];
delete obj;   //Deletion of an object
}
/*Definition of target object method*
*Describe only Increment() method. Omit constructor
and destructor*
/Order::Increment()
{
a = a+1 .. Increment of thread-specific data
DosRequestMutexSem(hmtx, SEM_INDEFINITE_WAIT);
//Request semaphore to perform exclusive control
//of a stock object.
Stock->Store(a);         //Invoking of Store
method
DosReleaseMutexSem(hmtx);    //Release
semaphore.
}
```

Thus, in the conventional multithread server programming, the programmer had to manage all by himself the contention among threads and the timing of deleting an object. This led to the risk of causing waste of memory due to program errors or data mismatch due to the contention among threads. These factors could cause the system reliability and throughput to degrade, or cause the server system to halt at worst. In particular, if a programmer at a relatively low skill level develops a server application, it is an important problem to provide a high degree of isolation to threads so that the respective processings do not interfere with each other.

Further, since the programmer must always be careful not to cause such problems, he must spend sufficient time in test and debug, which causes a problem of reduction in the productivity of programs.

Furthermore, in developing a typical multithread program in which requests are received from a plurality of clients and processed in parallel, there is a problem that the individual processings may interfere with each other. That is, the interference may produce a wrong result even though the individual processings are correct. To avoid such problem and develop a safe program, it is necessary to separately process the requests of clients and prevent the individual processings from interfering with each other as much as possible. Such technique for easily achieving the isolation of the individual processings is desired.

In connection with such prior art problems, Published Unexamined Patent Application Nos. 4-204656 and 4-195228 disclose a technique for declaring thread-specific data in the same fashion as global variables by analyzing a program in which a plurality of threads exists, and holding a specific data area start address for each thread during the execution of the program. However, even in such technique, since the programmer had to manage all by himself the contention among threads and the timing of deleting an object, the waste of memory due to program errors and the data mismatch due to the contention among threads could not be avoided.

On the other hand, in the conventional multithread control method such as Published Unexamined Patent Application No. 4-321136, once a thread is created, a certain memory region is allocated, but, even if the CPU execution right is not provided, the memory region is maintained until the program ends, and thus resources are not effectively used.

SUMMARY OF THE INVENTION

It is an object of the present invention to obviate the necessity of giving low-level instructions when describing a multithread program capable of concurrently processing the requests from clients, and provide the programmer with an environment in which he can create a multithread program without requiring high skill, thereby to increase the productivity of programming.

It is a further object of the present invention to avoid the waste of memory due to program errors and the data mismatch due to the contention among threads, thereby to increase the system reliability and throughput.

It is still a further object of the present invention If to provide a multithread control method in which resources are effectively used.

To solve these problems, an object to be referenced only from a single thread (referred to as thread object) is introduced, and to hide multithread-specific low-level processings (e.g. management of threads, exclusive control, synchronization, etc.), they are provided in the form of component. With the thread object proposed in the present invention, a safe program having a high degree of thread isolation can easily be constructed. Further, in the multithread programming, it is deemed that thread management, protection of shared resources using semaphore or the like, synchronization among threads, and the like are difficult. In the present invention, by providing such multithread-specific low-level processings in the form of component, the program development can be eased.

Although the thread object is effective in writing a safe program, there may be a case in which data must be shared among threads. In the present invention, considering such point, another type of object called shared object is provided. Being different from the thread object, the shared object can be accessed from a plurality of threads, and methods such as lock/unlock are provided in the viewpoint of protecting shared resources.

Moreover, in the present invention, the thread object and shared object are implemented by a lock object reference table and a global object reference table to ease the description of dedicated and shared resources. And, the user chooses whether the thread object or shared object is to be created. In the preferred embodiment of the present invention, the thread object and shared object are expressed by visualized program components, and by selecting them, either the shared object or the thread object is specified.

Before processing the client requests in the server, a thread/thread object control unit registrations the thread objects and shared objects specified by design into the global object reference table. Into the global object reference table, both thread and shared objects are registered. Stored in the table are the name of an object, the pointer to the object, and a flag indicating whether it is a thread object. In the global object reference table, as the entry of a shared object, the pointer to the actual object to be used is stored. On the other hand, the entry of a thread object becomes a template which is copied and used when client requests are processed.

BRIEF DESCRIPTION OF THE DRAWINGS

Preferred embodiments of the present invention will now be described by way of example only with reference to the accompanying drawings, in which:

FIG. 8 is a diagram showing an embodiment of the proxy ID table of the present invention;

FIG. 9 is a diagram showing an embodiment of the global object reference table of the present invention;

DETAILED DESCRIPTION OF THE PREFERRED EMBODIMENTS OF THE INVENTION

Figure 1:
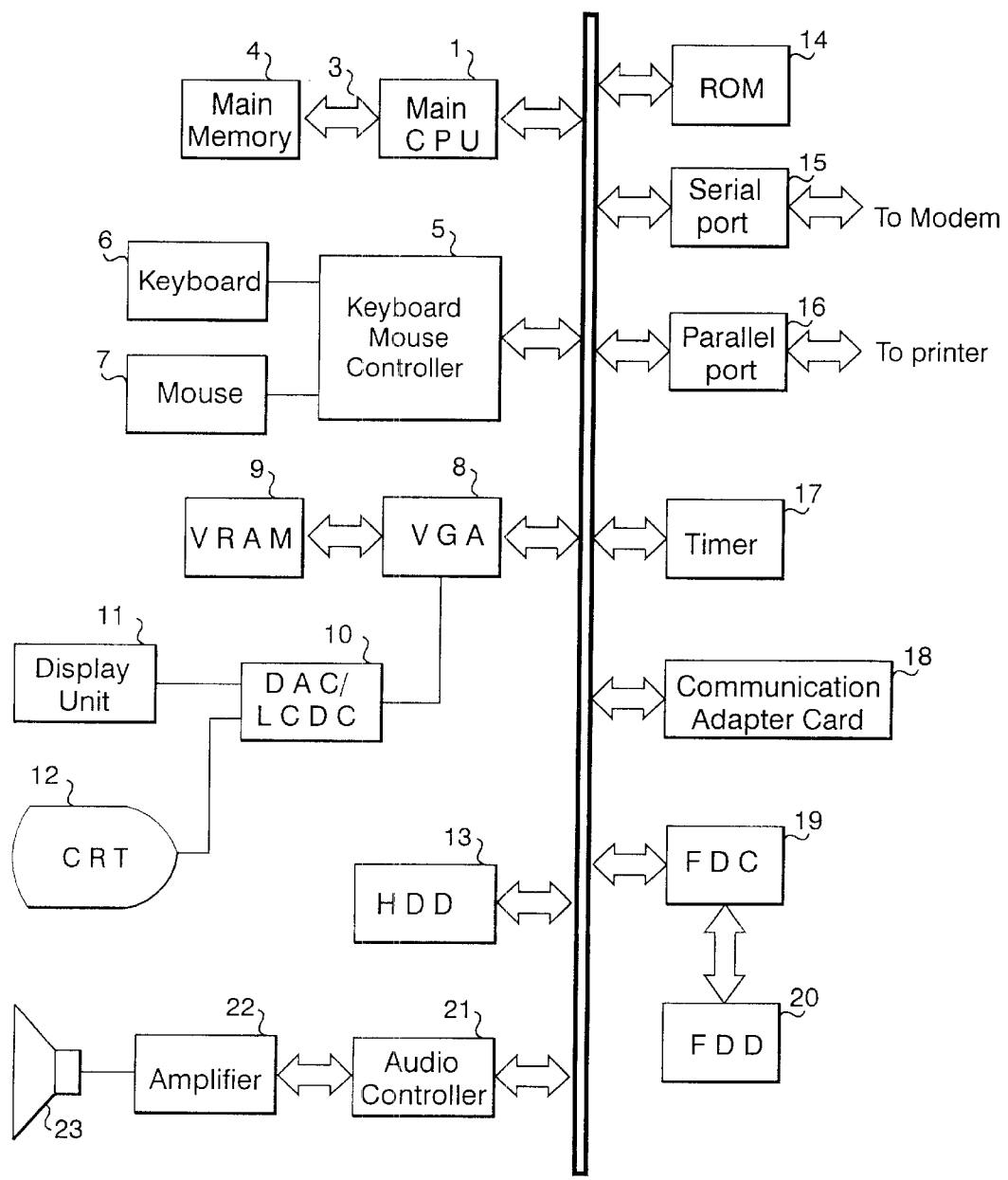
FIG. 1 is a block diagram showing an embodiment of the hardware configuration.

In one aspect of the present invention, a method for processing a plurality of data processing requests in a memory area managed by a data processing system is provided. The method comprising the steps of: detecting the reception of a data processing request containing object identifying information and thread object template identifying information; creating a thread within the memory area in response to the detection of the reception; creating a thread object according to a thread object template corresponding to the thread object template identifying information; associating the thread object with the thread object identifying information; and deleting the created thread.

The "object identifying information" is a concept corresponding to the proxy ID in the preferred embodiment of the present invention to be described later, and it is information for identifying an object. Further, the "thread object template identifying information" is a concept corresponding to the object name in the preferred embodiment of the present invention to be described later. And, the "data processing request" is a concept corresponding to the client request in the preferred embodiment of the present invention, and the "data processing request" is not a concept limited to a data processing request from a client to a server, but it is a concept which includes a processing request in a stand-alone environment, a TSO (Time Sharing Option) environment, and the like.

Further, "creating a thread object according to a thread object template" includes not only previously creating and storing a thread object template substantially in the same form as a thread object, and creating a thread object by copying the thread object template, but also previously storing information necessary for creating a thread object as a thread object template, and creating a thread object using the information of the thread object template.

And, "associating the thread object with the thread object identifying information" is a concept corresponding to the registrating of the pointer to an actual object and the proxy ID into a proxy ID map in the preferred embodiment of the present invention, but it is concept which includes not only associating the thread object with the thread object identifying information by a table, but also all the operations for enabling a thread object to be identified by the thread object identifying information. Also, "deleting the thread" is a concept which includes not only the freeing of the memory area used as the thread but also the case in which the memory area used as the thread is freed on the occurrence of a certain condition, though it is not immediately freed. For instance, in the embodiment of the present invention, by setting the thread ID to 0, the thread set to 0 can be used when the creation of a thread is needed by another client request or the like.

In another aspect of the present invention, a method for processing a plurality of data processing requests in a memory area managed by a data processing system is provided, the method comprising the steps of: detecting the reception of a data processing request containing object identifying information; creating a thread within the memory area in response to the detection of the reception; deleting a thread object prestored in the data processing system and corresponding to the thread object identifying information; and deleting the created thread object.

In another aspect of the present invention, a method for processing a plurality of data processing requests in a memory area managed by a data processing system is provided, the method comprising the steps of: detecting the reception of a data processing request containing object identifying information and method identifying information; creating a thread within the memory area in response to the detection of the reception; identifying a thread object prestored in the data processing system and corresponding to the thread object identifying information; associating the identified thread object with the thread; executing a method associated with the method identifying information of the thread object in the thread; and deleting the created thread.

In another aspect of the present invention, a storage medium for storing a program for processing a plurality of data processing requests in a memory area managed by a data processing system is provided the program comprising: program code means for instructing the data processing system to detect the reception of a data processing request containing object identifying information and thread object template identifying information; program code means for instructing the data processing system to create a thread within the memory area in response to the detection of the reception; program code means for instructing the data processing system to create a thread object according to a thread object template corresponding to the thread object identifying information; program code means for instructing the data processing system to associate the thread object with the thread object identifying information; and program code means for instructing the data processing system to delete the created thread.

In another aspect of the present invention, a storage medium for storing a program for processing a plurality of data processing requests in a memory area managed by a data processing system is provided, the program comprising: program code means for instructing the data processing system to detect the reception of a data processing request containing object identifying information and thread object template identifying information; program code means for instructing the data processing system to create a thread within the memory area in response to the detection of the reception; program code means for instructing the data processing system to create a thread object according to a thread object template corresponding to the thread object template identifying information; program code means for instructing the data processing system to associate the thread with the thread object; and program code means for instructing the data processing system to delete the created thread.

"Associating the thread with the thread object" is a concept which corresponds to the registrating of the pointer to an actual object into a table corresponding to the thread ID in the local object reference table in the preferred embodiment of the present invention. In another aspect of the present invention, a system for processing a plurality of data processing requests is provided, the system comprising: a data processing request queue for receiving and storing a data processing request containing thread object template identifying information and thread object identifying information; a thread/thread object control unit for receiving the data processing request stored ion the data processing request queue; a thread control unit for creating a thread; a global object reference table for pointing a thread object template prestored in the data processing system and corresponding to the thread object template identifying information; an object control unit for creating a thread object according to the thread object template pointed in the global object reference table; and a local object reference table for associating the thread object with the thread.

In another aspect of the present invention, a method is provided for executing, in a data processing system, a program in which a plurality of instructions is described, the method comprising the steps of: detecting the descriptions of the object name and the method name of a thread object existing in the program; checking whether or not the thread object exists in the data processing system; if the thread object does not exist, creating a thread object according to a thread object template corresponding to the object name; and executing the method of the created thread object which corresponds to the method name.

In another aspect of the present invention, a method is provided for executing, in a data processing system, a program in which a plurality of instructions is described, the method comprising the steps of: detecting the descriptions of the object named the method name of a thread object existing in the program; checking whether or not the thread object exists in the data processing system; and if the thread object exists, executing the method of the thread object which corresponds to the method name.

In another aspect of the present invention, a method is provided for executing, in a data processing system, a program in which a plurality of instructions is described, the method comprising the steps of: detecting the descriptions of the object name and the method name of a thread object existing in the program; checking whether or not the thread object exists in the data processing system; if the thread object does not exist, creating a thread object according to a thread object template corresponding to the object name; registering the object name in the data processing system; and executing the method of the created thread object which corresponds to the method name.

In another aspect of the present invention, a data processing system for executing a program in which a plurality of instructions is described is provided, the system comprising: an object lookup manager for detecting the descriptions of the object name and the method name of a thread object existing in the program; a local object reference table into which whether or not the thread object exists is registered; and a thread object template for storing information for creating the thread object.

In another aspect of the present invention, a storage medium is provided for storing a program for executing, in a data processing system, a program in which a plurality of instructions is described, the program comprising: program code means for instructing the data processing system to detect the descriptions of the object name and the method name of a thread object existing in the program; program code means for instructing the data processing system to check whether or not the thread object exists in the data processing system; and program code means for instructing the data processing system to execute the method of the thread object which corresponds to the method name, if the thread object exists.

Hardware Construction

Now, the embodiment of the present invention is described with reference to the drawings. Referring to FIG. 1, a schematic diagram of the hardware construction (on the server side) for implementing the present invention is shown. A system 120 includes a central processing unit (CPU) 1 and a memory 4. The CPU 1 and the memory 4 are connected to a hard disc drive 13 as an auxiliary storage via a bus 2. A floppy disc drive (or drive unit for a various storage medium such as CD-ROM, MO, MD, ZIP or DVD) 20 is connected to the bus 2 via a various controller 19 such as floppy disc controller.

In the floppy disc drive (or drive unit for a various storage medium such as CD-ROM) 20, a floppy disc (or various storage medium such as CD-ROM) is inserted, and in the floppy disc or the like, the hard disc drive 13, and a ROM 14, the code of a computer program for giving instructions to the CPU in cooperation with an operating system to implement the present invention can be recorded. This code of the computer program may be compressed, or divided into a plurality of portions to be recorded on a plurality of media.

The system 120 may be a system provided with user interface hardware, and the user interface hardware includes, for instance, a pointing device (mouse, joy stick or the like) 7 or a keyboard 6 for inputting, and a display 12 for presenting visual data to the use. Further, a printer can be connected through a parallel port 16, and a modem can be connected through a serial port 15. Communications with other computers are made possible through the serial port 15 and the modem, or a communication adapter 18.

Accordingly, it may easily be understood that the present invention can be implemented by a conventional personal computer (PC) or workstation, or a combination of these. However, these structural elements are only for exemplification, and all of these structural elements are not always the essential structural elements of the present invention. For instance, FIG. 1 shows a system of a stand-alone environment, but it may also be possible that the present invention is implemented as a client/server machine, the system 120 of the present invention is located in the server machine, the client machine is connected to the server machine by LAN connectivity such as Ethernet or Token Ring, and on the client machine side, an input device for creating and inputting a server program to be described later, and a display device for showing the execution result of the program are placed. Further, a change such as constructing this system in cooperation with another server can freely be added at the design stage.

As the operating system, the one which supports a GUI multiwindow environment as standard is desirable, such as Windows 95, Windows NT ("Windows 95" and "Windows NT" are trademarks of Microsoft Corporation), OS/2 ("OS/2" is a trademark of IBM Corporation), and X-WINDOW system ("X-WINDOW system" is a trademark of MIT Corporation) on AIX ("AIX" is a trademark of IBM Corporation), but the present invention can be embodied even with a character-based OS as long as it supports multithread, and is not limited to a specific operating system environment or API environment.

System Configuration

Figure 2:
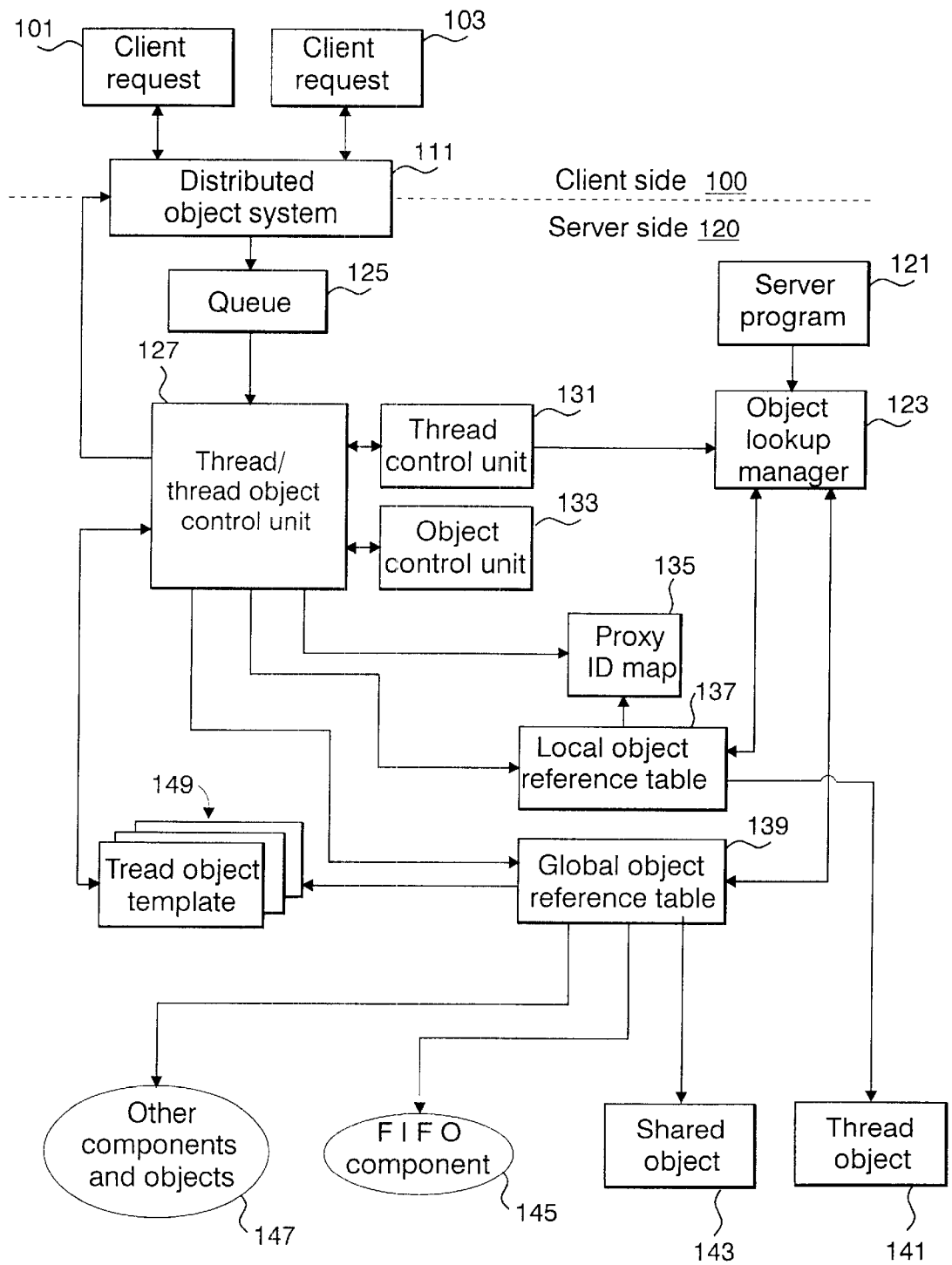
FIG. 2 is a functional block diagram showing an embodiment of the system configuration of the present invention.

Now, with reference to the block diagram of FIG. 2, the system configuration of the present invention is described. In the figure, a distributed object system 111 enables the provision of data of a common format to the server side by absorbing the differences in he resource management method, hardware, and language on the client side. Although, in the preferred embodiment of the present invention, DSOM (Distributed System Object Model) provides this function, the present invention can also be implemented by other distributed object systems such as DCOM ("DCOM" is a trademark of Microsoft Corporation). The distributed object system 111 converts a plurality of client requests 101 and 103 into a common format, and stores them in a queue (data processing request queue) 125 managed by the server 120.

A thread/thread object control unit 127 interprets the client requests of the common format which are stored in the queue, and performs the generation and deletion of a thread or object, and the registrating of them into a local object reference table 137 or a proxy ID map.

A thread control unit 131 generates and deletes a thread. To execute a multithread program, a thread must be generated or deleted as necessary. Such thread management can be divided into the following cases.

(1) The case in which the request from a client is processed. In this case, a specific function needs to be executed in response to the request from a client, and a thread must be created for that. For such external request, the system automatically generates a thread, and deletes it at the end.

(2) The case in which the callback function of a component (for instance, a FIFO component to be described later) is executed. In this case, a thread is generated immediately before the execution of the callback function, and it disappears after the execution of the function. Since the thread management is performed by the component itself, the user need not write the code for managing the thread. Since the thread management is performed by the system in the former and by the component itself in the latter, the user need not write the code for managing the thread in any case.

An object control unit 133 generates and deletes a thread object. The creation of a thread object is carried out by copying a thread object template 149 prestored in the system. The detailed operation for this is described later.

A proxy ID map 135 manages information for associating the client requests 101 and 103 with actual objects 141 and 143.

The local object reference table 137 manages the information on a thread object. In addition, a global object reference table 139 manages the information for creating a thread object (the thread object template 149).

Further, an object lookup manager 123 searches for the object specified in a server program 121, and it creates the object if the information on the object is not managed. Also, it determines whether a thread object or shared object is specified.

Processing Request from Client

The following description is related to how the requests from clients are processed in the preferred embodiment of the present invention. In the preferred embodiment of the present invention, the client requests 101 and 103 are converted by the distributed object system 111 into the packet information shown in FIG. 3, and stored in the queue 125 in the order the reception by the server. In the preferred embodiment of the present invention, the packet information 129 is information unique to the client requests 101 and 103. However, the implementation can be made even if the packet information is generated in a plural number for one client request, or a plurality of client requests having the common contents is converted into one piece of packet information.

The distributed object system 111 is provided on the assumption that the formats of client requests would be different for each client request. Accordingly, it is an unnecessary structural element in a system in which client requests are made in a common format.

Further, in the preferred embodiment of the present invention, a method is employed in which, each time the client requests 101 and 103 occurs, the client requests are stored in the queue 125 on the server 120 side, but a method can also be employed in which the server sequentially asks a plurality of clients whether they have a request, and the clients can send out to the server 120 side a request only to that question, and in this case, the queue 125 becomes an unnecessary structural element.

Figure 3:
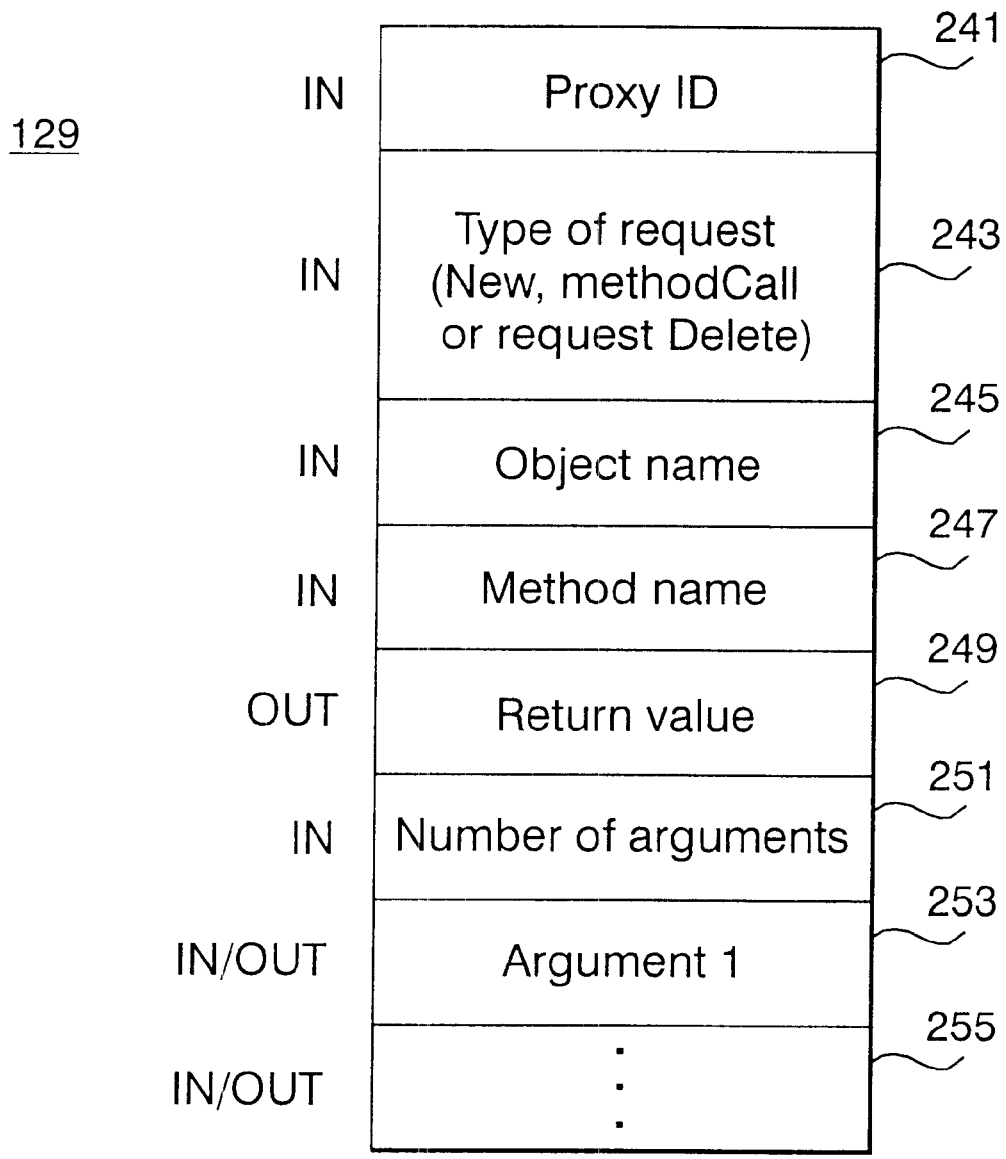
FIG. 3 is a diagram showing an embodiment of the data structure of the information packet stored in the queue of the present invention.

A proxy ID 241 shown in FIG. 3 is information showing from which client the request came. In the preferred embodiment of the present invention, the distributed object system 111 sets this information uniquely for the object requested by each client. A request type entry 243 manages the contents of the processing requested by a user. As described later, in the preferred embodiment of the present invention, there are three types of user requests: request for creating an object (New), request for a method (MethodCall), and request for deleting an object (Delete). In this specification, the various requests to objects are called object actions.

In the request type entry 243, data such as numerals, characters or symbols is stored so that the thread/thread object control unit 127 can determine the type. However, since the thread/thread object control unit 127 can also determine the type of a client request by the contents of the packet information 129, it is not an essential element of the present invention to provide the request type entry 243 in the packet information 129 to manage the request type information. In such case, it is also possible that, for instance, if only the information of the proxy ID 241 exists and the respective entries of object name 245, method name 247, and number of arguments 251, which are to be described later, contain no information, then it is determined to be a deletion request, and if it is not a deletion request, and information only on the proxy ID 241 and the object name 245 exists, and no information exists in each entry of method name 247 and number of arguments 251, then it is determined to be a creation request, otherwise it is determined to be a request for method.

In the object name entry 245, the name of the object the processing of which is requested by a client is stored. In the method name entry 247, the name of the method the processing of which is requested by a client is stored. By the above object name and method name, the system identifies the method to be executed. If the user request asks for a return value, the return value as a result of the user request is stored in the return value entry 249.

In the number of arguments 251, the total number of arguments specified in the user request is stored. In a number of arguments 253, the contents of the first argument specified in the user request are stored. And, pieces of information on arguments corresponding to the number (=n) of the above described number of arguments 251 are stored.

This request packet is sequentially processed in the server 120, and the result is returned to the distributed object system 111 and control is again returned to the client side. The contents of such process are described below according to the types of client requests.

Request for Creating a Thread Object

Figure 4:
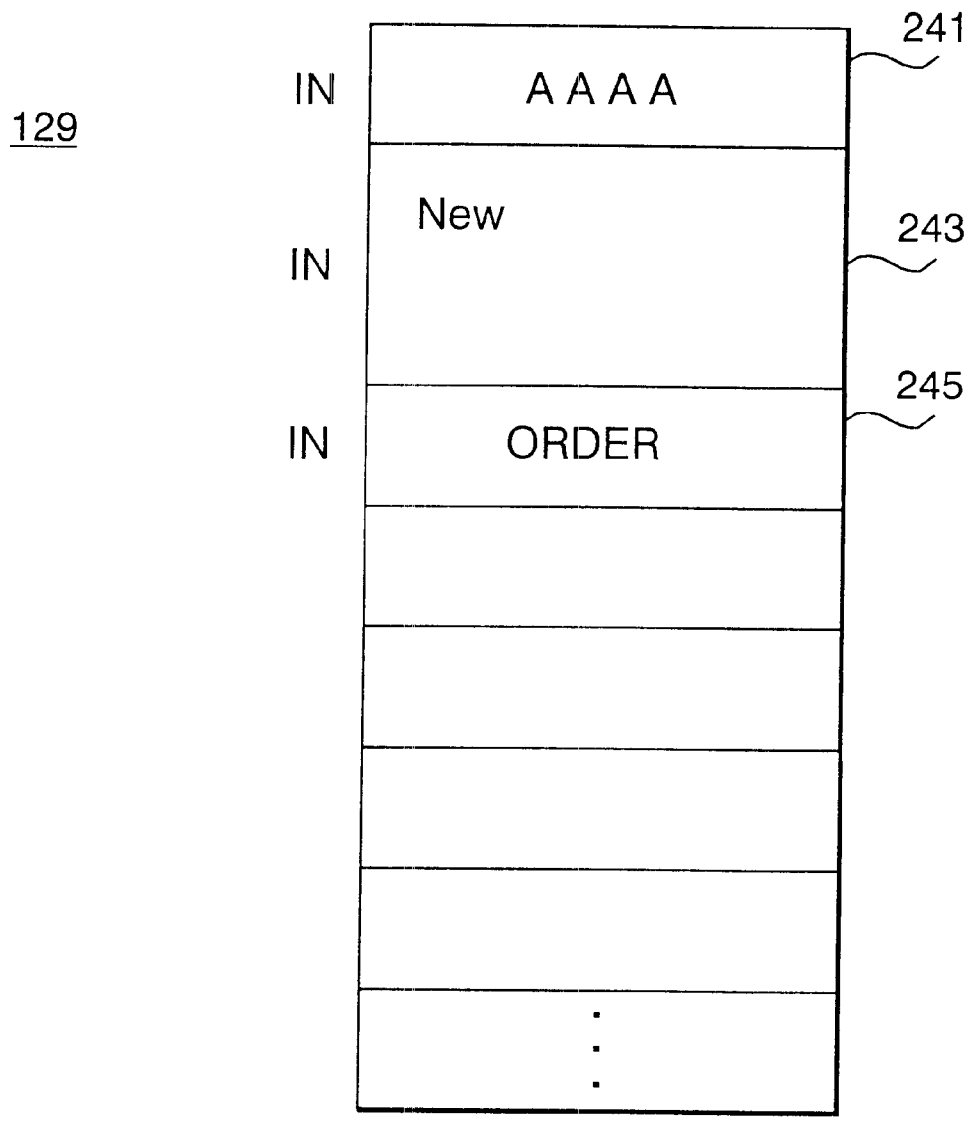
FIG. 4 is a diagram showing an embodiment of the data structure of the information packet stored in the queue of the present invention.

If the request from a client is "creation of an object," the information shown in FIG. 4 is set in the request packet. That is, in the request type entry 243, information indicating the New request is set, and in the entry of proxy ID 241, the proxy ID corresponding to the object the generation of which is requested by the client is stored. The proxy ID is set uniquely to the object, and the information on the set proxy ID is returned to the client (or distributed object system 111) side. Using this proxy ID, the client (or distributed object system 111) side can utilize the generated object. The distributed object system 111 can convert the proxy ID on a specific condition and return it to the client, and by receiving the same information as the returned to the client after the conversion, the system 111 also can specify again the proxy ID on which the conversion is based.

In the entry of object name 245, the name of the object to be generated is set. The request packet is read in by the thread/thread object control unit 127 as described above. From the contents of the request type entry 243, the thread/thread object control unit 127 learns that the contents of the request is the generation of an object, and it passes the thread object template 149 in the global object reference table 139 showing the object corresponding to the name in FIG. 9 to the object control unit 133.

The object control unit 133 makes a copy of the thread object template, and set the object name 245 of the request packet in the object name to generate the object requested by the user. By copying and making the thread object 141 out from the thread object template 149, and using it in this way, it is possible to avoid the situation in which a plurality of client requests contends for the utilization of the method or property of one object, and client requests can be concurrently executed.

The thread object template is previously created on the server side by executing a server program 121. The specific procedure for creating the thread object template is described later in detail. In the preferred embodiment of the present invention, the thread object template is stored in the system, in a form in which a thread object is made by copying it, but it needs only to manage the information necessary of r creating a thread object, and a thread object may be created not only by a simple copy, but also by some conversion of data format. For instance, the information which is common to a plurality of object template and the information which is not common to those templates may be separately managed so as to prevent duplication of the common information, or the data of thread object templates may be compressed and stored, and decompressed and used.

Simultaneously with the process for generating the object, a thread for processing the object generation request is obtained from the thread control unit 131. Specifically, the thread control unit 131 instructs the operating system (OS) to create a thread, and in response to this, the OS create a thread and sends the thread ID of the created thread back to the thread control unit 131. The technique for the OS to create a thread was publicly known at the time of filing the present invention, and the programmer can use the OS without being aware of it.

Figure 7:
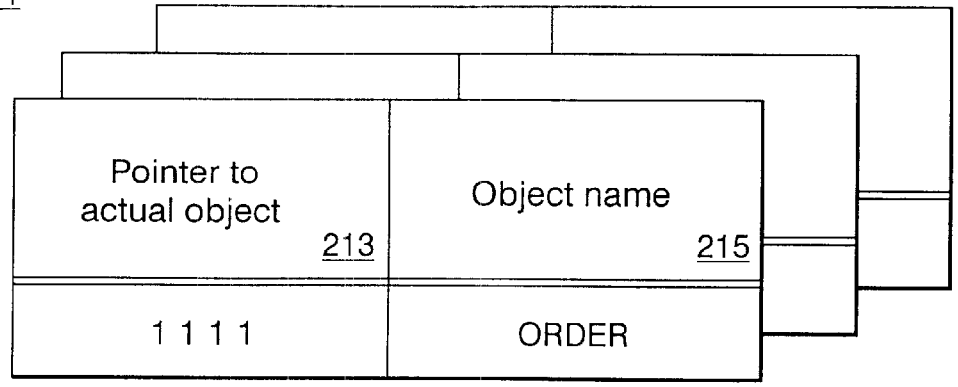
FIG. 7 is a diagram showing an embodiment of the local object reference table of the present invention.
Figure 7:
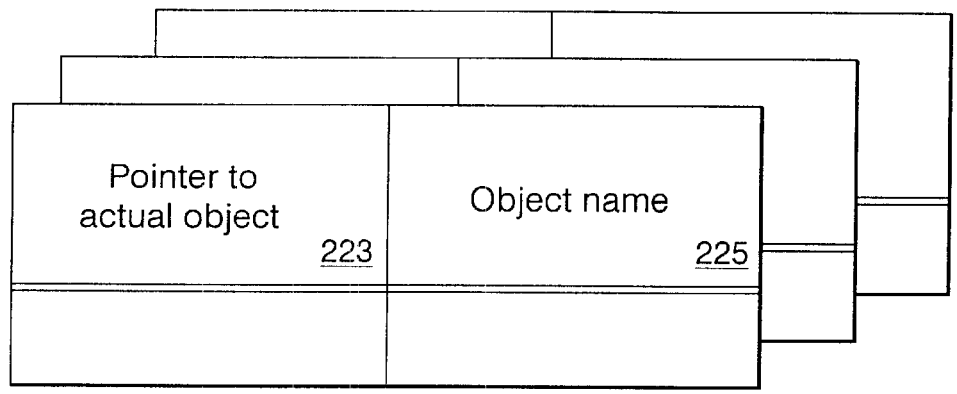

The thread/thread object control unit 127 registers the generated object information into the local object reference table 137. Specifically, as shown in FIG. 7, the local object reference table 137 is provided with thread ID(m) 211 and 221 given by the thread control unit 131 at the time of creating a thread, and for one thread, has entries 213 and 215 in which the object name and the pointer pointing to the object are stored. Stored in the entries 213 and 215 are the object name of the request packet and the pointer to the object actually created by the thread/thread object control unit 127.

Further, the pointer to the actually created object is registered into the proxy ID map 135 shown in FIG. 8. The proxy ID map 135 has an entry 231 of proxy ID and an entry 233 of the pointer to the object. Into the entries 231 and 235, a pair of the proxy ID and the pointer to the object obtained by copying are registered. This table allows the client to utilize the generated object through the use of the proxy ID.

Thereafter, the thread/thread object control unit 127 transfers thread control to the constructor of thread object. The object constructor is a method which is first initiated if the object specified in the server program is generated. By this constructor, the initial setting of each parameter, and the like can be carried out.

If the processing by the constructor terminates, control is returned to the thread/thread object control unit 127. The thread/thread object control unit puts the thread ID added to the table registered in the local object reference table 137 in an "unassigned" state (in the preferred embodiment of the present invention, setting "0" in the thread ID causes the system to determine that the thread is in the "unassigned" state), and deletes the thread and returns control to the client. The created table remains as it is, and it is used for a method request to the object which is performed thereafter.

Request for Deleting an Object

Figure 5:
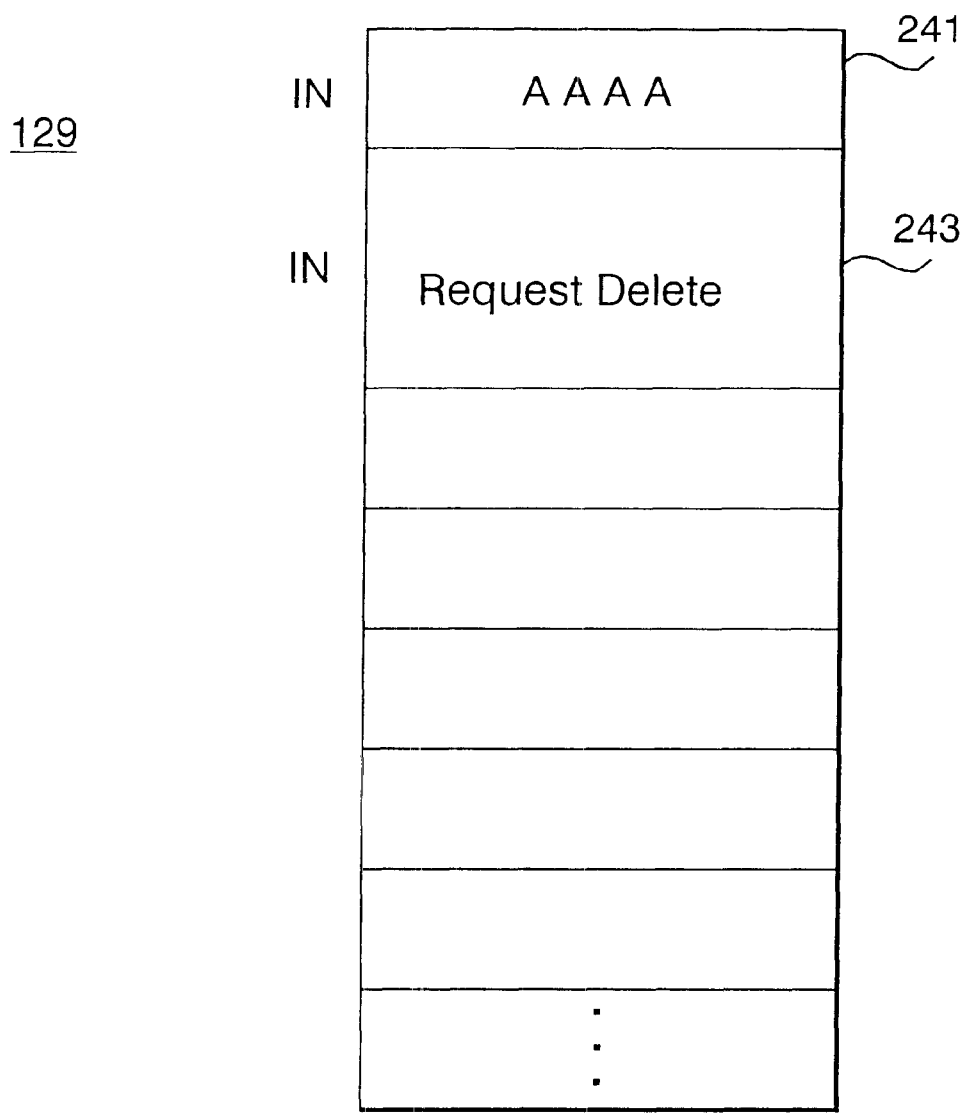
FIG. 5 is a diagram showing an embodiment of the data structure of the information packet stored in the present invention.
Figure 6:
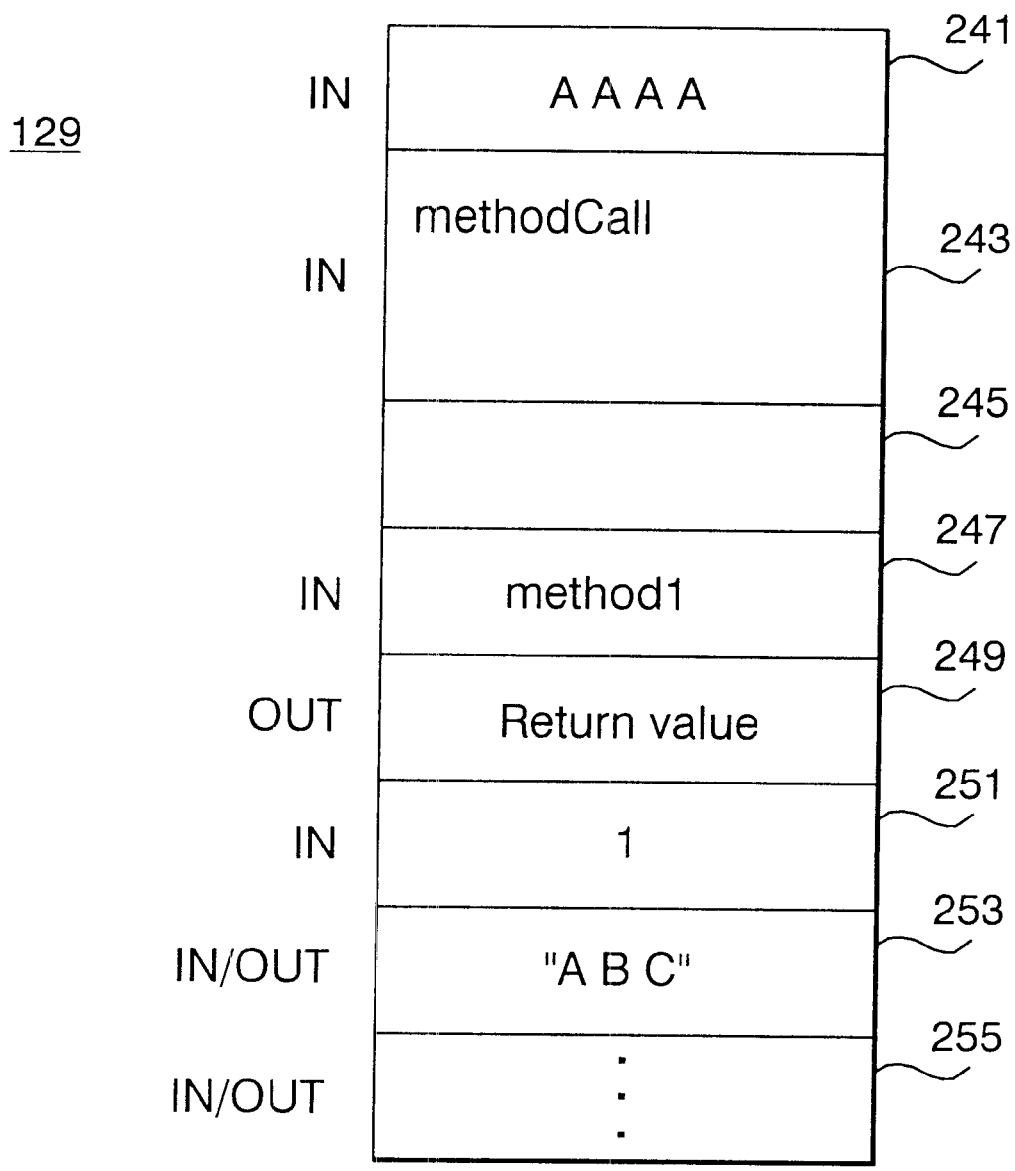
FIG. 6 is a diagram showing an embodiment of the data structure of the information packet stored in the queue of the present invention.

When the deletion of an object is requested from a client, the information shown in FIG. 5 set in the request packet. Specifically, the proxy ID for identifying the object of the client and the request for deletion are specified.

The thread/thread object control unit 127 receives this request packet, and searches for the subject thread object from the proxy ID map 135 by using the proxy ID as a key. The thread/thread object control unit 127 creates a thread for calling the destructor of the thread object. The destructor is a method added by the system when an object is generated, and it is executed when the deletion of the object is specified. By this destructor, the post-processing (termination processing) or the like can be performed for each parameter. The ID of the thread created in this processing is added to the local object reference table 137 of the subject object.

Thereafter, the thread/thread object control unit 127 performs the processing of the destructor in the created thread. After the end of the destructor in the created thread. After the end of the processing, the thread/thread object control unit 127 performs the deletion of the object pointed by the entry associated with the thread ID through the object control unit 133. Thereafter, it deletes the corresponding entry from the local object reference table 137. It also deletes the entry having the "pointer to the object" deleted from the proxy ID map 135. Then, it deletes the thread, and returns control to the client side.

Invoking the Method of an Object

When a method is invoked from a client, the invoking is performed to the previously created object through the thread/thread object control unit 127. The thread performing the invoking of the method of an object is created when a request from the queue is received by the thread/thread object control unit 127. The thread/thread object control unit 127 locates the subject thread object from the proxy ID map 135 by the proxy ID in the packet. After adding the ID of the created thread to the table having the pointer to the subject object, the method of the subject object is executed.

At the end of the processing of the object method, the thread/thread object control unit 127 writes the processing result (if any) back to the request packet, and returns the result to the client. And, it puts the thread ID given to the local object reference table 137 in an "unassigned" state, and deletes the thread. In the present invention, for each of the object actions of creation, use, and deletion of a thread object, a thread is created, and the thread is deleted each time any object action terminates, and thus the memory region is not occupied more than necessary, and the limited resources held by the system can be effectively used.

Working Procedure of the Programmer

Now, how to use shared objects and thread objects in the preferred embodiment of the present invention is described along the working procedure of the programmer.

Object Definition Procedure

FIGS. 10 to 14 are diagrams showing the setting procedure of a thread object in the preferred embodiment of the present invention. Although only the setting procedure of a thread object is shown in this specification, a shared object is set in a procedure similar to the thread object except the point that a method is not set. This is because it is considered that, if the shared object is allowed to define a method, an interference may occur among threads to cause a problem on safety. From this viewpoint, the role of the shared object is clearly defined as storing data to be shared.

Figure 10:
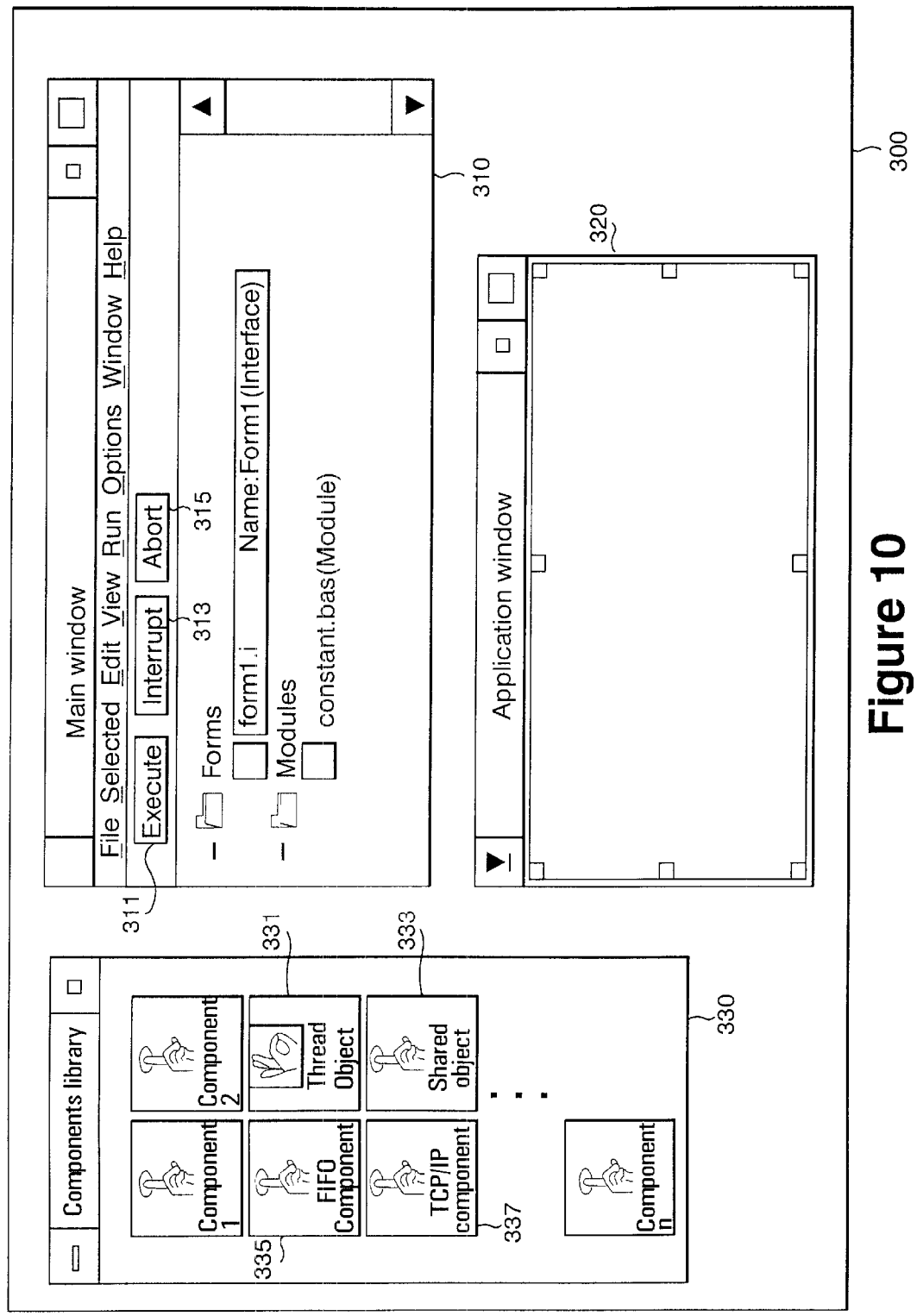
FIG. 10 is a diagram showing the setting procedure for a thread object in the preferred embodiment of the present invention.

FIG. 10 shows the initial state in the setting procedure of a thread object. In the figure, a main window 310 is the main window of the builder, and it is a window for managing various forms corresponding to an application window 320 and various codes stored in a code storing unit 109.

In the initial state, the application window 320 contains no information, and the programmer uses the application window 320 to specify program components (objects), or the like. The application window enables the programmer to perform an intuitive programming.

Figure 11:
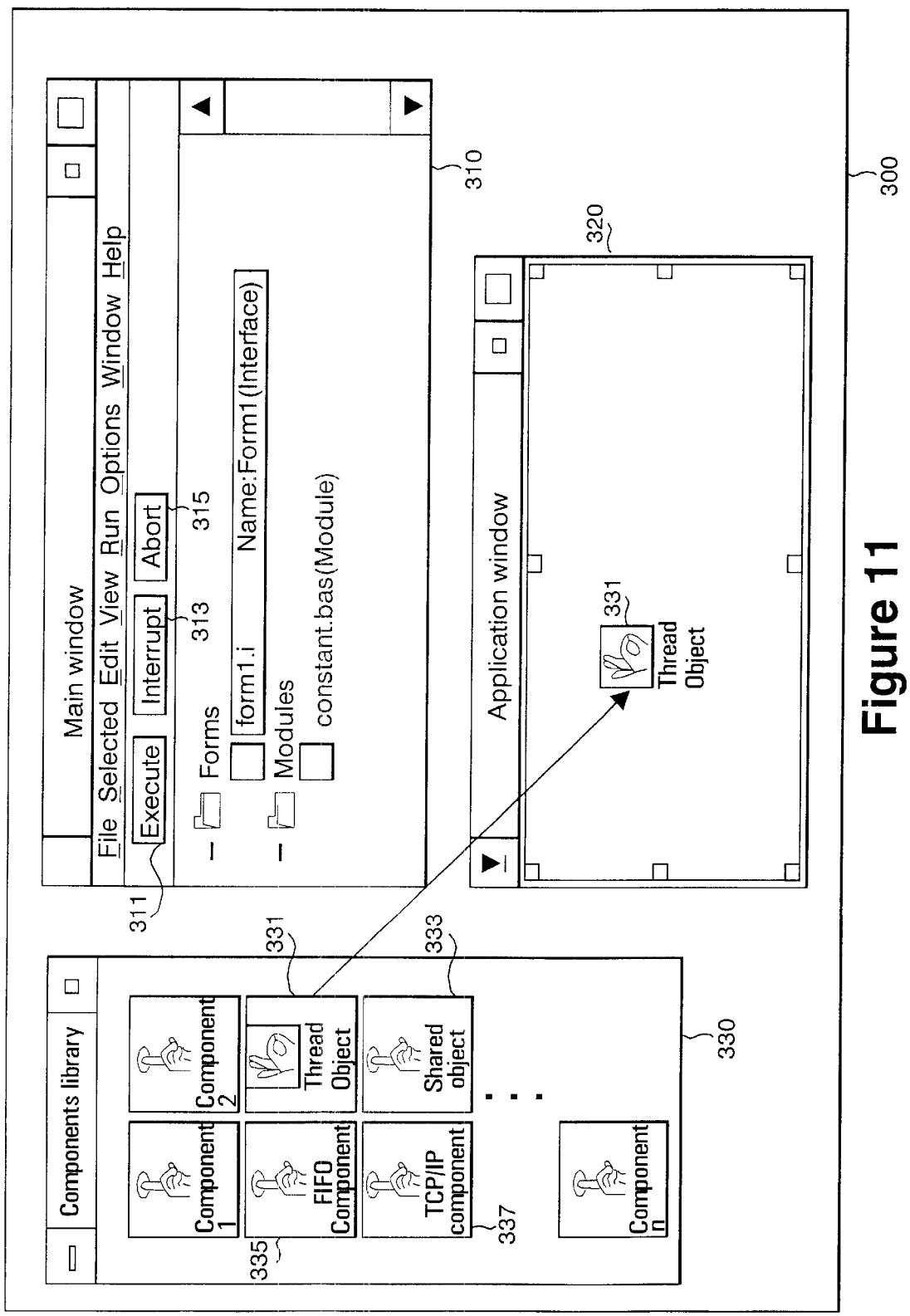
FIG. 11 is a diagram showing the setting procedure for a thread object in the preferred embodiment of the present invention.

A group of a plurality of icons placed on the upper-left portion of the figure is a components library 330. Each of the icons corresponds to a program component. Of these icons, the icon 331 designated by "thread object" is dedicated to user-defined thread objects. When the programmer creates a new thread object, he first drops the thread icon 331 into the application window 320 (icon 321), as shown in FIG. 11. There are various techniques for positioning the icon 331 at the application window 320, for instance, double-click of the icon 331, depression of a present key while the icon 331 is being selected, and the like in addition to drag and drop. Various settings are available at the design stage.

Figure 12:
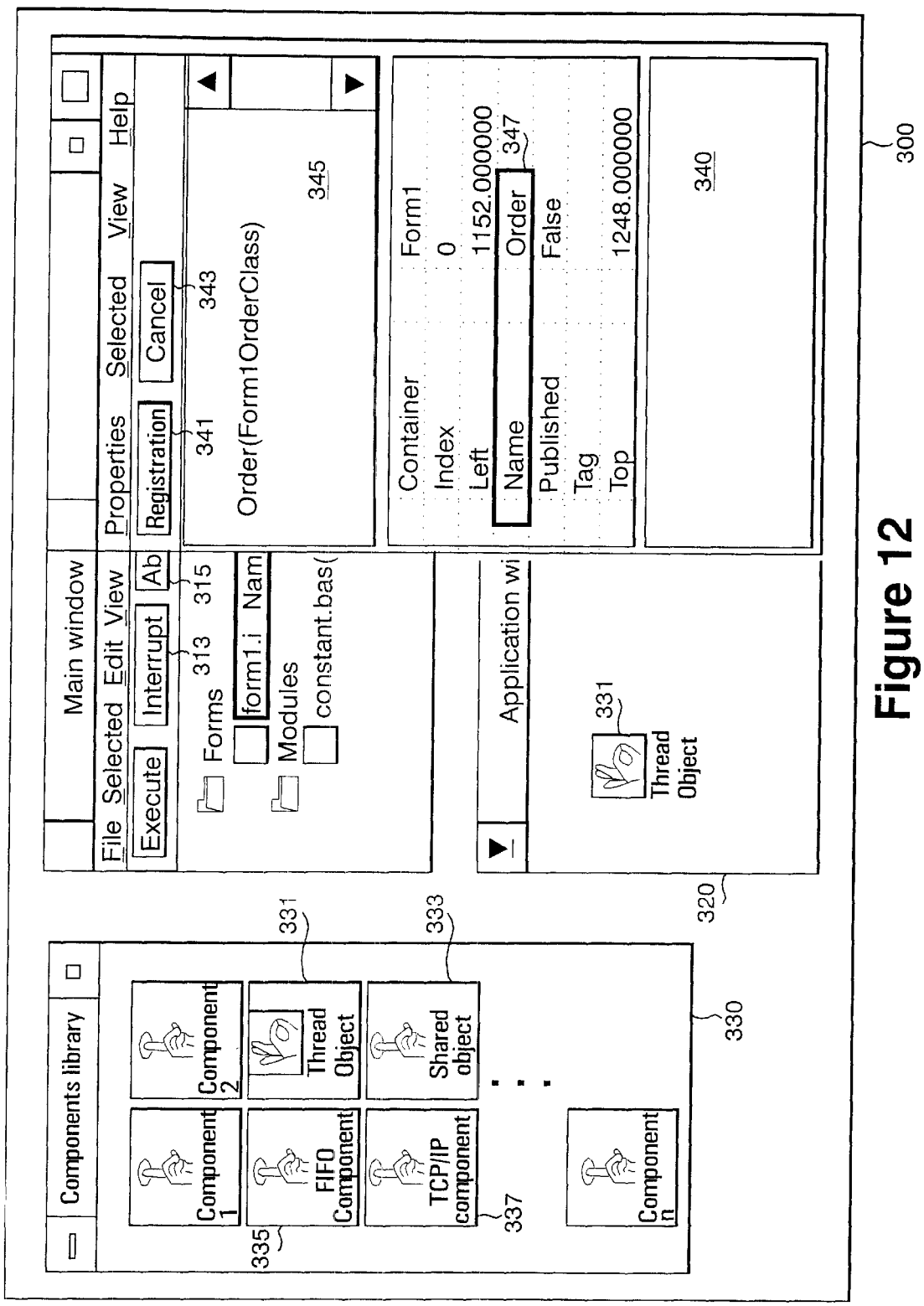
FIG. 12 is a diagram showing the setting procedure for a thread object in the preferred embodiment of the present invention.

Then, as shown in FIG. 12, when the programmer clicks the Window entry of the main window 310 to display a pull-down menu, and selects the item "property editor," a property editor window 340 opens. With this window, the programmer can set an object name. In the figure, the programmer sets the object name to "Order" by key-in at the object name input entry 347 of the property editor window 340. And, the contents of the input by the programmer is registered by clicking a button icon 341 designated by "Registration." By this operation, the object name 203 "Order" corresponding to the object name "Order" is registered into the global object reference table 139. The flag 205 of the thread object is set to "1" (Yes). Further, into the pointer of actual object 201, an address value for pointing the definition information of object to be described later is registered.

Figure 13:
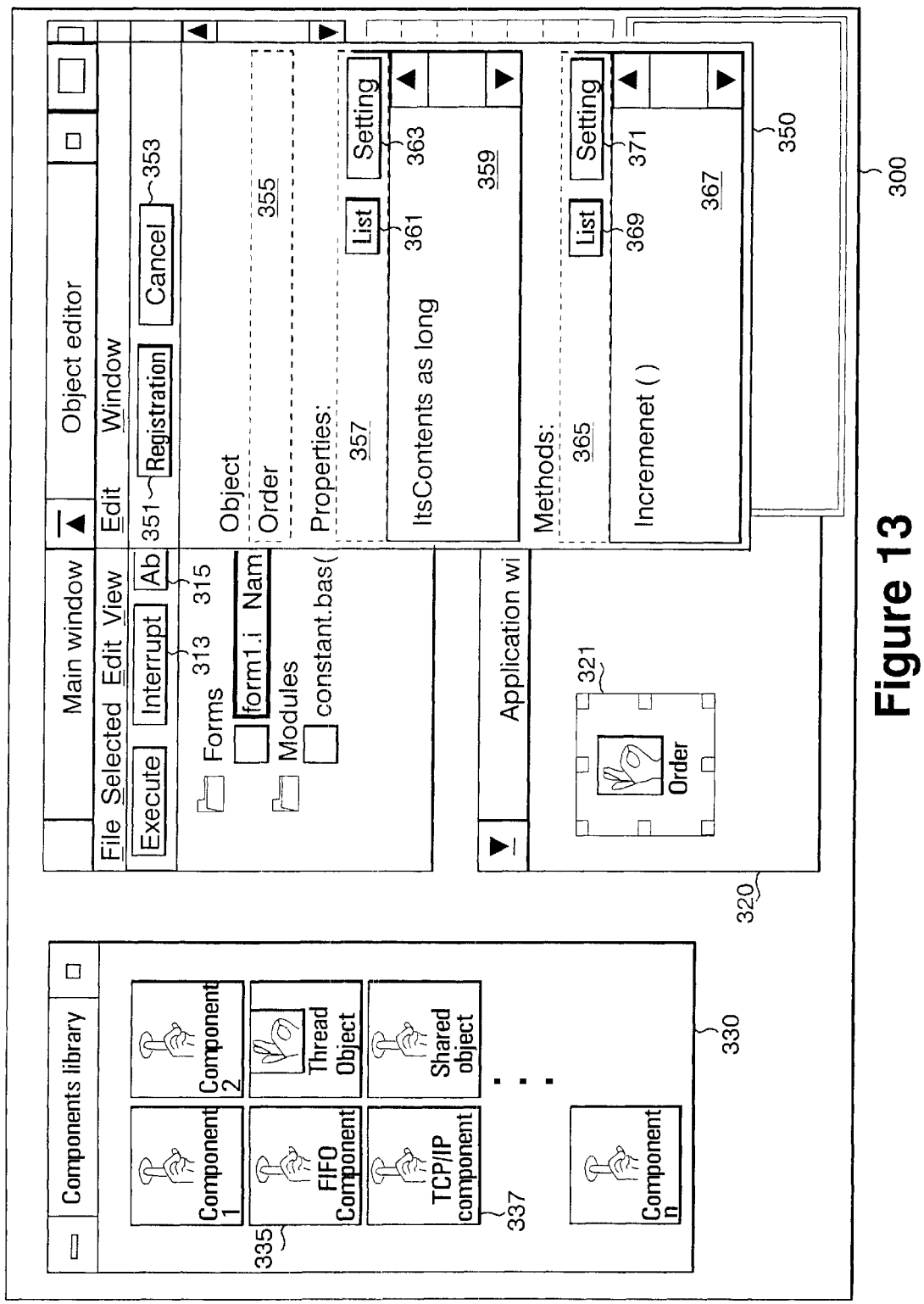
FIG. 13 is a diagram showing the setting procedure for a thread object in the preferred embodiment of the present invention.

When the setting of the object name is completed, then the programmer registers a property and a method. The window 350 displayed in FIG. 13 is object window. Since an object name 355 is displayed in the object window 350, the programmer can easily see that the property or method of the thread object "Order" is being defined. In FIG. 13, the registration of the property is performed first. The property definition can be performed by keying a property name and property type into the property input entry 357. In addition, by clicking the button icon 361 designated by "List," standard property names and property types are displayed in the form of a pull-down menu, and the programmer can select and use one from the list. The character string described in the property input entry 357 is registered by clicking a button icon for registration 363. After the property is registered, the contents of the definition registered in the list of registered properties 359 are added in the object window 350. In the figure, it is shown that the define statement of a property "ItsContents as long" has been registered.

Figure 14:
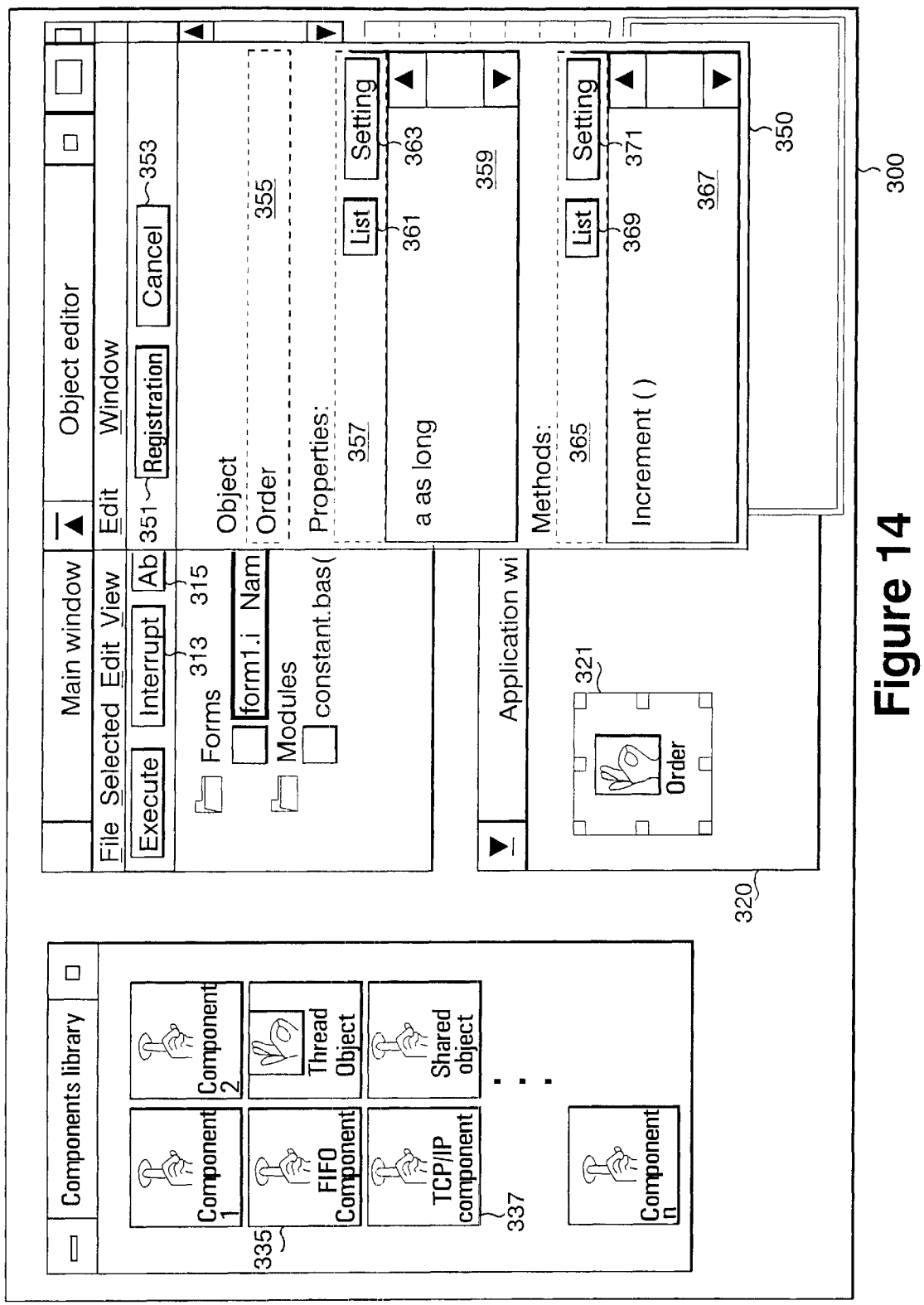
FIG. 14 is a diagram showing the setting procedure for a thread object in the preferred embodiment of the present invention.

In FIG. 14, the registration of the property is followed by the registration of a method. The property registration may be performed first, or the method registration may be performed first. The 10 method registration can be performed by keying a method name and a method type into the input entry 365, as in the property registration. Further, when a button icon 361 designated by "List" is clicked, standard method names and method types are displayed in the form of a pull-down menu, and the programmer can select and use one from the list.

The character string described in the method entry 365 is registered by clicking the button icon for registration 363. After the method registration, the contents of the registered definition is added to the list of methods 367 in the object window 350. In the figure, it is shown that the define statement of a method "Increment ( )" has been registered. The code of the method representing the contents of the actual execution of the code can be defined in a code editor 380 to be described later.

Once the method registration is performed, the information on the objects which can be pointed by the pointer to actual object 201 in the global object reference table 139 is updated.

Procedure for Creating a Server Program

Figure 15:
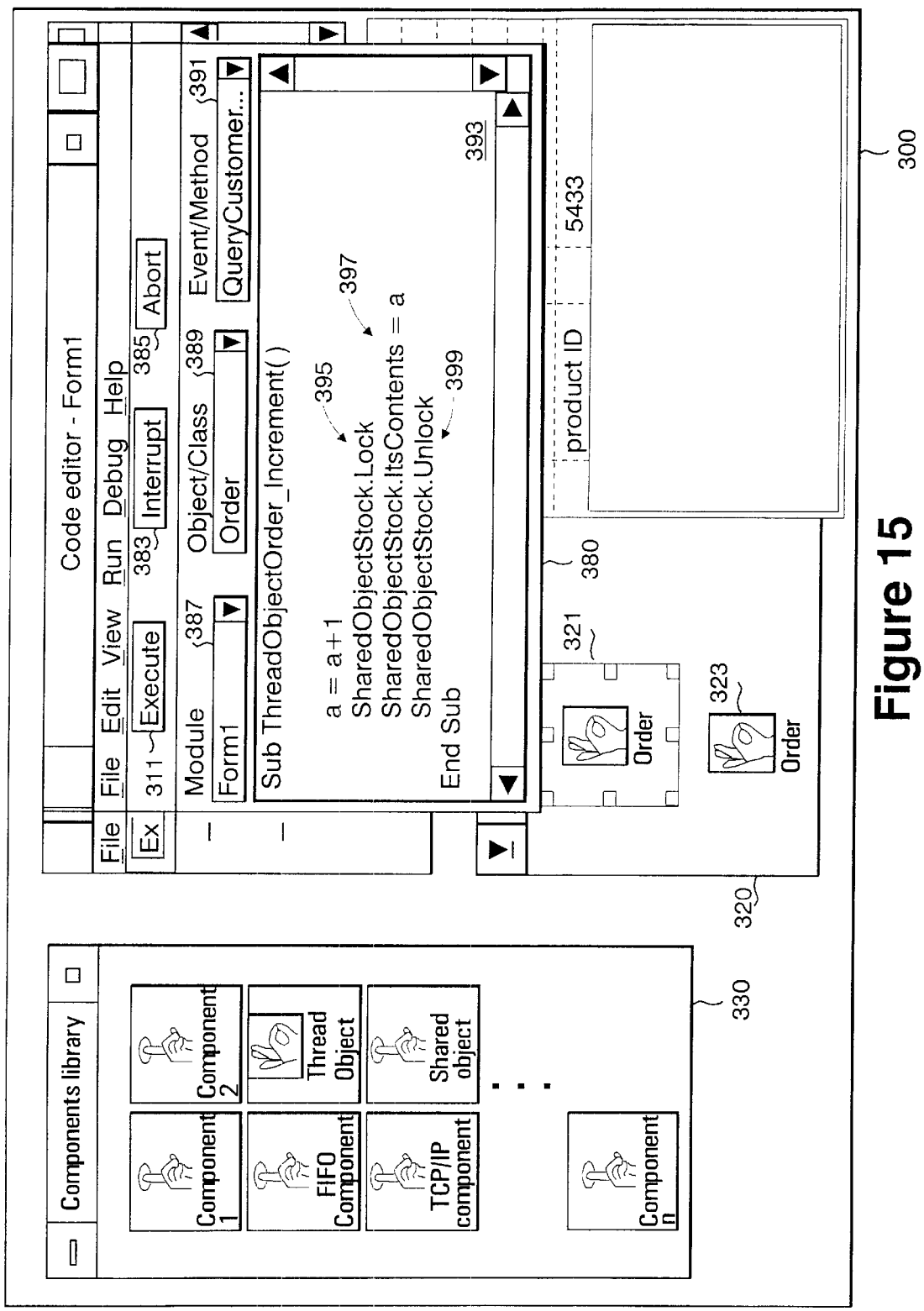
FIG. 15 is a diagram showing the setting procedure for a thread object in the preferred embodiment of the present invention.

Now, description is made to how the above user-defined thread object information is used by the programmer in the program development. FIG. 15 shows the procedure for using thread objects in the preferred embodiment of the present invention. In FIG. 15, the programmer uses the code editor window 380 to code a server program. In the code of a method having an object name "Order" and a method name "Increment" in the figure. The contents of the code described in a code description entry 393 in the figure are transferred to the interpreter so as to be executed as the code of the method.

In the code editor window, three types of entries, namely, a module entry 387, an object entry 389, and a method entry 391 are provided. The programmer specifies the component name and method name of a code inputted to the code description entry by direct keying them into these entries. The entries 387, 389, and 391 have a function of pull-down menu.

The pull-down menu of the module entry 387 is provided to invoke other forms (other codes edited by other code editors). The form selected in this pull-down menu is displayed in the code description entry 393. The pull-down menu of the object entry 389 is a pull-down menu for retrieving and selecting other thread objects. The pull-down menu of the method entry 391 is a pull-down menu for retrieving and selecting other methods.

If a button icon for execution 381 is clicked, this code is passed to the interpreter and executed according to the above procedure. In addition to the button icon for execution 381, button icons for interrupt and abort 383 and 385 are provided, and the clicking of these buttons can interrupt or abort the execution of a program.

To call a thread object from the server program, the object name and method name and argument of the destination thread object are passed to the object lookup manager 123 from the server program. The object lookup manager 123 first performs retrieval as to whether the subject object is already registered in the local object reference table 137. For the retrieval, the name of the object specified in the server program 121 and the ID of the thread being executed (which can be obtained from the thread control unit 131) are used.

If already registered, it is determined that the subject object has already been created, and control is transferred to the subject thread object. If not registered, the object lookup manager 123 searches for the corresponding object template 149 from the above global object reference table 139, and creates the thread object by copying the thread object template 149. Then, it registrations the object name into the local object reference table 137 of the corresponding thread ID. A plurality of objects can be registered for one thread ID. Thereafter, using the transferred method name and argument, the method of the thread object is executed.

Any of the above cases is not true, it is determined that the subject object is not a thread object, and the control located from the global object reference table 139 is transferred to the subject object (shared object, FIFO component 145, or other components and objects 147).

As shown in FIG. 15, the programmer can use a FIFO component by using the icon 355 of FIFO component. The FIFO component is a program component provided to satisfy the requirement that the access to shared resources be limited when a plurality of threads is concurrently executed. For instance, output to a printer, a file access, and the like. In such cases, it is required that the requests from a plurality of threads be executed in sequence, and the FIFO component 145 provides such function. While the request to the FIFO component 45 is processed, other threads are in a standby state, and when the process terminates, the next request is processed. Usually, a low-level API (such as semaphore) provided by the OS must be used to implement such process, but the synchronization component can facilitate the implementation of a synchronous process by hiding such low-level process.

Further, in addition to the FIFO component 145, the programmer can also use other components such as TCP/IP component 337 or object 147. The TCP/IP component 337 is a program component for enabling the communication with other systems.

As described above, the programmer can utilize various objects and program components in the coding of the server program, and thus, the server program shown in the background art can be described as follows using a thread object "ThreadObjectOrder" and a shared object "SharedObjectStock".

```
ThreadObjectOrder::Increment()
{
a = a+1;
SharedObjectStock->Look();
SharedObjectStock->itsContents = a;
SharedObjectStock->Unlock();
}
```

The method Increment( ) of ThreadObjectOrder is automatically invoked when a client request is processed in the server by the apparatus implemented by the present invention. SharedObjectStock cannot have a method except Lock( ) and Unlock( ) provided as default. To access a shared object, only property is used.

As described above, in accordance with the present invention, giving low-level instructions is obviated when describing a multithread program in which the requests from clients can be simultaneously processed, and a multithread program can be created without high skill. Further, in accordance with the present invention, the waste of memory due to program errors and the data mismatch due to the contention among threads can be avoided, and thus the system reliability and throughput can be increased. Furthermore, in accordance with the present invention, the maintenance of unnecessary memory is obviated when a program is executed under multitask control, and thus resources can effectively used.

While the invention has particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for processing a plurality of data processing requests in a memory area managed by a data processing system, said method comprising the steps of:
    (a) detecting the reception of a data processing request containing object identifying information and thread object template identifying information;
    (b) creating a thread within said memory in response to said detection of the reception and assigning a specified memory area to the thread;
    (c) creating a thread object associated with the thread by automatically making a copy of a thread object template correspondin to said thread objec template identifying information for the detected data processing request;
    (d) associating said thread object with said thread object identifying information; and
    (e) deleting said created thread by freeing said specified memory area.

2. A method for processing a plurality of data processing requests in a memory area managed by a data processing system, said method comprising the steps of:
    (a) detecting the reception of a data processing request containing object identifying information;
    (b) automatically creating a thread within said memory area in response to said detection of the reception for said request and assigning a specified memory area to the thread;
    (c) deleting a thread object, associated with the thread, prestored in said data processing system and corresponding to said thread object identifying information; and
    (d) deleting said created thread by freeing said specified memory area.

3. A method for processing a plurality of data processing requests in a memory area managed by a data processing system, said method comprising the steps of:
    (a) detecting the reception of a data processing request containing object identifying information and method identifying information;
    (b) automatically creating a thread within said memory area in response to said detection of the reception and assigning a specified memory area to the thread;
    (c) identifying a thread object prestored in saiddata prestored corresponding to said thread object identifying information;
    (d) associating said identified thread object with said thread in a predefined manner;
    (e) executing a method associated with said method identifying information of said thread object in said thread; and
    (f) deleting said created thread by freeing said specified memory area.

4. A storage medium for storing a program for processing a plurality of data processing requests in a memory area managed by a data processing system, said program comprising:
    (a) program code means for instructing said data processing system to detect the reception of a data processing request containing object identifying information and thread object template identifying information;

(b) program code means responsive to said detection of the reception for instructing said data processing system to create a thread within said memory area and assigning a specified memory area to the thread;

(c) program code means for instructing said data processing system to create a thread object associated with the thread by automatically making a copy of a thread object template corresponding to said thread object template identifying information for said request;

(d) program code means for instructing said data processing system to associate said thread object with said thread object identiying information; and (e) program code means for instructing said data processing system to delete said created thread by freeing said specified memory area.

5. A storage medium for storing a program for processing a plurality of data processing requests in a memory area managed by a data processing system, said program comprising:

(a) program code means for instructing said data processing system to detect the reception of a data processinf request containing object identifying information and thread object template identifying information;

(b) program code means for instructing said data processing system to create a thread within said memory area in response to said setection of the reception and assigning a specified memory area to the thread;

(c) program code means for instructing said data processing system to create a thread object by automatically making a copy of a thread object template corresponding to said thread object template identifying information for said request;

(d) program code means for instructing said data processing system to associate said thread with said thread object in a predefined manner; and (e) program code means for instructing said data processing system to delete said created thread by freeing said specified memory area.

6. A system for processing a plurality of data processing requests, said system comprising:

(a) a data processing request queue for receiving and storig a data processing request containing thread object template identifying information and thread object identifying information;

(b) a thread/thread object control unit for receiving said data processing request stored in said data processing request queue;

(c) a thread control unit for creating a thread ad assigning a specified memory area to the thread;

(d) a global object reference table for pointing a thread object template prestored in said data processing system and corresponding to said thread object template identifying information;

(e) an object control unit for creating a thread object by automatically making a copy of thr thread object template pointed in said global object reference table for said data processing request; and (f) a local object reference table for associating said thread object with said thread in a predefined manner.

7. A method for executing, in a data processing system, a program in which a plurality of instructions is described, said method comprising the steps of:

(a) detecting the descriptions of the object name and the method name of a thread object existing in said program;

(b) checking whether or not said thread object exists in said data processing system;

(c) if said thread object does not exist, creating a thread object by automatically making a copy of a thread object template corresponding in a predefined manner to said object name in response to said detecting step; and (d) executing the method of said created thread object which corresponds to said method name of the thread object.

8. A method for executing, in a data processing system, a program in which a plurality of instructions is described, said method comprising the steps of:

(a) detecting the descriptions of the object name and the method name of a thread object existing in said program;

(b) checking whether or not a copy of said thread object exists in said data processing system; and (c) if said copy of said thread object exists, automatically executing the method of said copy of said thread object which corresponds in a predefined manner to said method name of the thread object.

9. A method for executing, in a data processing system, a program in which a plurality of instructions is described, said method comprising the steps of:

(a) detecting the descriptions of the object name and the method name of a thread object existing in said program;

(b) checking whether or not said thread object exists in said data processing system;

(c) if said thread object does not exist, creating a thread object by automatically making a copy of a thread object template corresponding in a predefined manner to said object name;

(d) registering said object name in said data processing system; and (e) executing the method of said created thread object which corresponds to said method name of the thread object.

10. A data processing system for executing a program in which a plurality of instructions is described, said system comprising:

(a) an object lookup manager for detecting the descriptions of the object name and the method name of thread object existing in said program;

(b) a local object reference table for managing information on the thread object and into which information indicating whether or not said thread object exists is registered; and (c) a thread object template for storing information for automatically creating one or more copies of said thread object for current execution of said one or more copies of said thread object.

11. a storage medium for storing a program for executing, in a data processing system, a program in which a plurality of instructions is described, said program comprising:

(a) program code means for instructing said data processing system to detect the descriptions of the object name and the method name of a thread object existing in said program;

(b) program code means for instructing said data processing system to check whether or not a copy of said thread object exists in said data processing system; and (c) program code means for managing information on the thread object and for instructing said data processing system to execute automatically the method of said copy of said thread object which corresponds in a predefined manner to said method name, if said copy of said thread object exists.

12. A method according to claim 1, wherein:

the request is from a client, and a specific function needs to be executed in response to the request; and the deleting step includes the step of deleting the created thread at the end of the execution of the specific function.

13. A method according to claim 1, wherein:

for the execution of the request is for the execution of a callback function;

the step of creating the thread includes the step of creating the thread immediately befor execution of the callback function; and the deleting step includes the step of deleting the created thread after the execution of the callback function.

14. A method according to claim 2, wherein:

the request is from a client, and a specific function needs to be executed in response to the request; and the step of deleting the created thread includes the step of deleting the created thread at the end of the execution of the specific function.

15. A method according to claim 1, wherein:

the request is for the execution of a callback function;

the step of creating the thread immediatelyh before execution of the callback function; and the step of deleting the created thread includes the step of deleting the created thread after the execution of the callback function.

16. A method according to claim 3, wherein:

the request is from a client, and a specific function needs to be executed in response to the request; and the deleting step includes the step of deleting the created thread at the end of the execution of the specific function.

17. A method according to claim 3, wherein:

the request is for the execution of a callback function;

the step of creating the thread includes the step of creating the thread immediately befor execution of the callback function; and the deleting step includes the step of deleting the created thread after the execution of the callback function.

* * * * *

UNITED STATES PATENT AND TRADEMARK OFFICE
CERTIFICATE OF CORRECTION

PATENT NO.    : 6,463,480 B2                                          Page 1 of 1
DATED         : October 8, 2002
INVENTOR(S)   : M. Kikuchi et al.

It is certified that error appears in the above-identified patent and that said Letters Patent is hereby corrected as shown below:

Column 3,
Line 29, "invention If to" should read -- invention to --

Column 16,
Line 18, "correspondin" should read -- corresponding --
Line 18, "objec" should read -- object --
Line 49, "saiddata" should read -- said data --

Column 17,
Line 11, "identiying" should read -- identifying --
Line 21, "processinf" should read -- processing --
Line 27, "setection" should read -- detection --
Line 50, "ad" should read -- and --
Line 56, "thr" should read -- the --

Column 19,
Line 16, "befor" should read -- before --

Column 20,
Line 4, "immediatelyh" should read -- immediately --
Line 20, "befor" should read -- before --

Signed and Sealed this

Eleventh Day of March, 2003

JAMES E. ROGAN
*Director of the United States Patent and Trademark Office*